United States Patent [19]

Fryd et al.

[11] Patent Number: 4,533,574

[45] Date of Patent: Aug. 6, 1985

[54] POLYIMIDE COATING COMPOSITIONS OF ESTERIFIED ANHYDRIDE AND AROMATIC AMINE MIXTURE

[75] Inventors: Michael Fryd, Haddonfield; Burt T. Merriman, Jr., Willingboro, both of N.J.

[73] Assignee: E. I. Du Pont de Nemours and Company, Wilmington, Del.

[21] Appl. No.: 650,759

[22] Filed: Sep. 14, 1984

[51] Int. Cl.³ .............................................. B05D 3/02
[52] U.S. Cl. .................................. 427/385.5; 427/82; 428/473.5; 524/104; 524/210; 524/600; 524/173
[58] Field of Search .......................... 427/82, 385.5; 252/62.3 Q, 570, 575; 428/473.5; 524/104, 210, 173, 600

[56] References Cited

U.S. PATENT DOCUMENTS

| | | | |
|---|---|---|---|
| 3,179,634 | 4/1965 | Edwards | 428/290 X |
| 3,190,856 | 6/1965 | Lavin et al. | 528/229 |
| 3,347,808 | 10/1967 | Lavin et al. | 427/385.5 X |
| 4,347,286 | 8/1982 | Ishizuka et al. | 427/385.5 X |
| 4,417,045 | 11/1983 | Nimry et al. | 528/188 |
| 4,485,140 | 11/1984 | Gannett et al. | 524/173 X |

FOREIGN PATENT DOCUMENTS

| | | | |
|---|---|---|---|
| 58-140252 | 8/1983 | Japan | 428/473.5 |
| 1317321 | 5/1973 | United Kingdom | 428/473.5 |

*Primary Examiner*—Thurman K. Page

[57] ABSTRACT

Compositions for the application of planar and solvent resistant polyimide coatings comprising an aprotic solvent solution of selected aromatic dianhydrides which have been at least 20% esterified with a volatile alcohol and an equivalent amount of a mixture of amines comprising selected diamines and polyamines.

8 Claims, No Drawings

POLYIMIDE COATING COMPOSITIONS OF ESTERIFIED ANHYDRIDE AND AROMATIC AMINE MIXTURE

FIELD OF THE INVENTION

The invention is directed to polyimide compositions, especially those which are capable of forming highly planar coatings and are solvent resistant.

BACKGROUND OF THE INVENTION

Polyimides find extensive use in electronic applications where they are useful in forming dielectric films on semiconductor devices. They are particularly useful as protective coatings for semiconductor devices.

It is well known in the polymer art to make thermally stable all-aromatic polyimides by the condensation polymerization of dianhydrides and diamines to form polyamic acid. Such polyimide precursors are disclosed inter alia in U.S. Pat. No. 3,179,634 to Edwards. These polyamic acids are readily dehydrated to the corresponding polyimides by heating at high temperatures, e.g. 300° to 400° C. These all-aromatic polyimides are not completely soluble and, therefore, protective films cannot be coated directly in the polyimide form. Instead, it is customary practice to use instead the precursor polyamic acids which have the advantage of being readily soluble in aprotic solvents. Such polyamic acid solutions are then coated to form the appropriate film and converted to the corresponding polyimide by heating the film at high temperature to effect volatilization of the solvent and dehydration of the polyamic acid to form the polyimide.

In the use of polyimide coatings as insulating layers over electronic devices, it is extremely important that the layer be as nearly planar as possible so that uniform overlying functional layers can be readily applied. As used herein the term "planarity" refers to the ability of the material to flow over structures of various shapes and produce a planar surface. In other words, the polyimide layer should be flat and not exhibit the surface imperfections of the underlying substrate and/or electronic components. This is extremely difficult to do for the reason that, as solvent is evaporated during the conversion of the polyamic acid to the polyimide form, the polymer shrinks and rapidly tends to become rigid and will not readily flow out to form a planar layer. In copending U.S. patent application Ser. No. 650,913 filed concurrently herewith. Fryd and Merriman disclose a method for making such planar coatings. While these coatings are very effective, their utility may in some instances be restricted because they are susceptible to solvent attack. However, the usefulness of such coatings would be enhanced still further if they could be made solvent resistant.

BRIEF DESCRIPTION OF THE INVENTION

In one aspect, the invention is directed to a method of applying a polyimide coating having both solvent resistance and high planarity comprising the sequential steps:

(a) forming a solution in aprotic solvent of an aromatic dianhydride which has been at least 40% diesterified with a volatile alcohol;

(b) dissolving in the solution of step (a) a substantially equimolar amount of a mixture of aromatic amines comprising 90-99 mole % diamine and 10-1 mole % salt of tri- or tetra-amine and volatile organic acid;

(c) applying the solution of step (b) to a substrate and heating it to a temperature of 200°-300° C. to effect de-esterification of the dianhydride with the formation of volatile alcohol therefrom, formation of polyamic acid by polycondensation with the aromatic amines and vaporization of volatile alcohol and solvent from the reaction solution; and (d) heating the polyamic acid to 300°-500° C. to effect decomposition of the tri- or tetra-amine salt with the formation of volatile organic acid, substantially complete alcohol organic acid and solvent removal, dehydration of the polyamic acid, formation of the corresponding polyimide, reflow and cross-linking of the free polyamine, the polyimide having a $T_g$ of 250°-330° C. and containing repeating polymer units having at least 2 flexible linkages or 1 flexible linkage derived from the dianhydride, provided the amine groups of the diamine are in the meta position relative to each other.

In a second aspect, the invention is directed to a composition for the application of planar polyimide coatings having good solvent resistance to a substrate comprising a solution in aprotic solvent of an aromatic dianhydride which dianhydride has been at least 20% esterified with a volatile alcohol and a substantially equimolar amount of a mixture of aromatic amines comprising 90-99 mole % diamine and 10-1 mole % salt of tri- or tetra-amine and volatile organic acid, the dianhydride and diamine containing a total of at least 2 flexible linkages, the dianhydride and diamine each containing at least 1 flexible linkage of the dianhydride containing at least 1 flexible linkage, provided the amine groups of the diamine are in the meta position relative to each other.

PRIOR ART

U.S. Pat. No. 3,190,856 to Lavin et al is directed to polyimides which are the polycondensation products of (a) a tetracarboxylic acid anhydride containing the benzophenone radical and (b) a $C_{6-16}$ aromatic primary amine.

U.S. Pat. No. 3,347,808 to Lavin et al is directed to coating compositions which are a solution of (a) a benzophenone tetracarboxylic acid or $C_{1-6}$ alkyl diester thereof and (b) either a $C_{2-6}$ aliphatic primary diamine or a $C_{6-36}$ aliphatic aromatic primary diamine and/or triamine.

DETAILED DESCRIPTION OF THE INVENTION

The preparation of polyamic acid precursors of polyimides is carried out by condensation polymerization of dianhydrides and diamines in an aprotic solvent medium. Therefore, suitable aprotic solvents for the method of the invention are N-methyl pyrrolidone, dimethylacetamide, dimethyl sulfoxide and dimethylformamide. N-methyl pyrrolidone is a particularly preferred solvent for use in the invention. Mixtures of the solvents can be used as well to adjust the volatility of the solvent medium. The solvent should, however, be substantially free of water to avoid the formation of reaction by-products with the dianhydride reactants. Solvents having a water content of no more than 0.1% wt. are preferred.

The choice of both the dianhydrides and the diamines is quite important in the method of the invention since they must yield polyimides which are low melting, i.e., that melt and flow at 350°–450° C. Thus, the polyimide should have a $T_g$ of 250°–330° C. and preferably 260°–320° C.

In order to obtain polyimides having these characteristics, it is necessary that repeating polymer units contain at least 2 flexible (hinge) linkages or 1 flexible linkage in the dianhydride moiety, provided the diamine contains amine groups which are in the meta position relative to each other. When each repeating polymer unit contains 2 or more flexible linkages, these linkages may be contained on either or both the dianhydride and the diamine. If the repeating polymer unit contains only 1 flexible linkage, then it must be in the dianhydride moiety and furthermore the amine moieties of the diamine must be in the meta position relative to each other. The term "flexible" or "hinge" linkage refers to connecting linkages between aromatic groups which are sterically capable of substantial rotation. In Table 1 below are listed several dianhydrides and diamines having suitable flexible linkages.

TABLE 1

Aromatic Dianhydrides and Diamines Containing Flexible Interaromatic Linkages

|  | Abbreviation |
|---|---|
| I Dianhydrides |  |
| Oxydiphthalic anhydride | ODPA |
| 2,2-bis(3,4-benzene carboxylic acid anhydride) propane | 6PDA |
| 2,2-(benzophenone tetracarboxylic acid dianhydride) | BTDA |
| 2,2-bis(3,4-benzenedicarboxylic acid anhydride) perfluoropropane | 6FDA |
| 2,2-bis-[4-(3,4-dicarboxyphenoxy) phenyl] hexafluoropropane | BFDA |
| Diphenylsulfone tetracarboxylic acid dianhydride | CSDA |
| II Diamines |  |
| Diaminobenzophenone | DABP |
| Methylene dianiline | MDA |
| Oxydianiline | ODA |
| 2,2-bis(p-dianiline) perfluoropropane | 6FDAm |
| Thiodianiline | TDA |
| 1,8-bis(4-aminothiophenoxy) perfluorooctane | ATPPO |
| 4,4'-(p-aminobenzoyldiphenyl) ether | BABDE |
| Resorcinal bis-aniline | RBA |
| 3,3'-diaminosulfone | MDAS |

In view of the foregoing criteria, it can be seen that aromatic dianhydrides such as pyromellitic dianhydride (PMDA) are not generally suitable for use in the invention since they contain no flexible linkages. Similarly, 1.5-diaminonaphthalene (1,5 ND) and paraphenylenediamine (PPD) are not suitable for the same reason. However diamines such as metaphenylenediamine and 3,5-diaminobenzoic acid, which also have no flexible interaromatic linkages, can be used because their amine groups are positioned in the meta position relative to each other. However, they must be used in conjunction with a dianhydride having at least 1 flexible group.

Though it is preferred that the polyimides of the invention be made from dianhydride and diamines meeting the above configurational criteria, it will be recognized that other dianhydrides and diamines which are not generally suitable can be used so long as the resultant copolymers have $T_g$ values within the range of 250°–330° C. and preferably 260°–320° C.

The alcohols which are suitable for carrying out the diesterification step of the invention are volatile monoalcohols, i.e., those which have atmospheric boiling points below 200° C., and which will be evaporated from solution when they are heated to 200°–300° C. Virtually any alcohol of the formula ROH is suitable so long as it meets the volatility criterion and the R group does not undergo any secondary reactions. Thus lower ($C_{1-6}$) alkanols and benzyl alcohol, phenol and cresol are all suitable, as are lower molecular weight ether alcohols such as ethylene or propylene glycol monoalkyl ethers. Polyols are not, however, suitable since they would form polyesters.

The amount of volatile alcohol should be sufficient to esterify at least 20% of the acid groups of the dianhydride and preferably at least 40%. It is undesirable to esterify less than 20% of the acid groups since the polymers made therefrom will be too high in molecular weight and therefore be too highly viscous to allow high solids solutions, which are necessary to give good layer planarity. As the degree of diesterification is increased, higher solids solutions are obtained which result in less shrinkage during cure and therefore give more planar coatings.

The esterification reaction between the dianhydride and alcohol is best carried out at 50°–100° C. to obtain fast reaction rates without volatilizing any substantial amount of the alcohol. No catalyst is required. Furthermore, the resultant half-ester remains substantially unreactive with aromatic diamines until the ester groups (R groups) are driven off upon heating the solution to about 200° C.

The polyamine salts which are added with the diamines serve as crosslinking agents which impart solvent resistance to the polyimides made therefrom. Because the polyamine moiety is in the salt form it is incapable of taking part to any significant degree in either polycondensation or crosslinking until the amine moieties are unblocked by removal of the salt. However, at about 300° C. the salt is decomposed with the concomitant formation of volatile organic acid. As the volatile acid is vaporized from the reaction solution, the unblocked amine groups of the polyamine undergo both polycondensation with the dianhydride and crosslinking with other polyimide molecules. Yet, because of the delay in the unblocking of the polyamines they do not interfere with polyimide reflow.

As indicated above either triamines or tetramines can be used in the invention. Such polyamines which can be used include: triamines such as 1,3,5-triaminobenzene, 2,4,5-triaminopyrimidine, 4,5,6-triaminopyrimidine and 2,4,6-triamino-5-triazine and tetramines such as 1,2,4,5-tetraminobenzene, 3,3',4,4'-tetraminobenzophenone, 3,3',4,4'-tetraminobiphenyl, 3,3',4,4'-tetraminophenyl ether and 2,4,5,6-tetraminopyrimidine.

The acid blocking agents are volatile organic acids having a pKa value of at least 5.5. Aliphatic, cycloaliphatic and aromatic acids are all effective. Preferred acids are formic, acetic and propionic acids.

Upon admixing the diamine with the dianhydride half ester at room temperature, no formation of polyamic acid will take place. However, the formation of polyamic acid will take place quite readily with any unesterified dianhydride in the solution.

It will ordinarily be preferred that approximately equimolar proportions of the reactants be used in the reaction system in order that adequate polymer molecular weight can be obtained. For this reaon, neither the dianhydride/amine ratio nor the diamine/dianhydride ratio should be less than 0.95. Within these approximately equimolar proportions, it is possible to obtain strong high molecular weight polyimides having an intrinsic viscosity (IV) of 0.3–0.9 as measured in N-methyl pyrrolidone at 25° C. Within the above-described limits, effective control of molecular weight can be obtained and molecular weight distribution is more narrow. Outside of the preferred stoichiometric range, molecular weights become too low and a wide range of molecular weight distribution is obtained.

The above-described solution of dianhydride half ester, amines, aprotic solvent and, to the extent that any of the dianhydride is not esterified, polyamic acid can be applied to a substrate by any suitable method such as spraying, spinning, screen printing, dipping and the like. However, regardless of the method of application, it is desirable that the concentration of polymer and/or polymer precursors be as high as possible in order to avoid high shrinkage of the finished polyimide coating. For this reason, it is not practicable to obtain planarity merely by solvent dilution. Instead, the method of the invention is designed to obtain planarity by providing high solids solutions of precursors of polyimides which are capable of reflowing at high temperatures to provide planar coatings.

After application to the substrate the composition is heated to 200°–300° C. to effect de-esterification of the dianhydride half ester. At this temperature, the alcohol which is formed therefrom is vaporized from the solution as well as part of the aprotic solvent. The dianhydride then reacts freely by polycondensation with the aromatic diamine to form the corresponding polyamic acid. As the polyamic acid is heated further to 300°–500° C., the polyamine salt is decomposed with the concomitant formation of volatile organic acid. The alcohol, organic acid and solvent are substantially completely removed by vaporization, all of the polyamic acid is dehydrated and converted to the corresponding polyimide which reflows to form a planar coating, and is crosslinked by the free polyamine.

EXAMPLES

Example 1

In this example, a polyimide was made in accordance with the method of the invention except that blocked tetramine was not added to the solution of step (b).

Into a three-neck 500 ml round bottom flask equipped with a thermometer, mechanical stirrer, drying tube and heating mantle were charged 88.8 g (0.2 mole) of 6 FDA, 12.9 (0.28 mole) of ethanol and 100 g of N-methyl pyrrolidone. The mixture was heated at 100° C. for one hour and cooled down to 40° C. To the clear reaction mixture was added a solution of 40 g of ODA (0.2 mole) in 112.6 g of NMP. The reaction mixture was stirred at ambient temperatures for three hours. The final product was a clear, amber solution which had 40% solids and a viscosity of 96 cps. It was coated on silicon wafers having metal lines 10 microns wide with 10 minutes spaces. The coated wafers were heated for 30 minutes at 200° C., 30 minutes at 300° C. and 20 minutes at 425° C. The planarity of the cured coatings measured with a Talley Alphastep was 94%. When the coated wafer was placed in a beaker full of NMP at 85° C., the coating dissolved after only one minute of immersion.

Example 2

This example illustrates the method of the invention in which an acid-blocked polyamine is used in conjunction with the aromatic diamine in step (b).

Into a three-neck 500 ml round bottom flask equipped with a thermometer, mechanical stirrer, drying tube and heating mantle were charged 88.8 g (0.2 mole) of 6 FDA, 13.5 g (0.30 mole) of ethanol and 90 g of N-methyl pyrrolidone. The mixture was heated at 100° C. for one hour and cooled down to 40° C. To the clear reaction mixture was added a solution of 35.2 g of ODA (0.176 mole) in 30 g of NMP, and the reaction product of 2.56 g of 3,3',4,4'-tetramino biphenyl (0.012 moles) and 2.88 g of glacial acetic acid in 14 g of NMP. The reaction mixture was stirred for an additional 3 hours and the final product was a clear, amber solution which had 48.2% solids and a viscosity of 10 poise. It was coated on silica wafers having metal lines 10 microns wide with 10 microns spaces. The coated wafers were heated for 30 minutes at 200° C., 30 minutes at 300° C. and 20 minutes at 425° C. The planarity of the cured coatings measured with a Talley Alphastep was 85%.

When the polyimide coated wafer was placed in a beaker of hot NMP at 85° C., it showed no effect by the solvent even after 3½ hours of immersion.

We claim:

1. A method of applying a polyimide coating have both solvent resistance and high planarity comprising the sequential steps:
    (a) forming a solution in aprotic solvent of an aromatic dianhydride which has been at least 20% diesterified with a volatile alcohol;
    (b) dissolving in the solution of step (a) a substantially equimolar amount of a mixture of aromatic amines comprising 90-99 mole % diamine and 10-1 mole % salt of tri- or tetra-amine and volatile organic acid;
    (c) applying the solution of step (b) to a substrate and heating it to a temperature of 200°–300° C. to effect de-esterification of the dianhydride with the formation of volatile alcohol therefrom, formation of polyamic acid by polycondensation with the aromatic amines and vaporization of volatile alcohol and solvent from the reaction solution;
    (d) heating the polyamic acid to 300°–500° C. to effect decomposition of the tri- or tetra-amine salt with the formation of volatile organic acid, substantially complete alcohol, organic acid and solvent removal, dehydration of the polyamic acid, formation of the corresponding polyimide, crosslinking and reflow of the polyimide, the polyimide having a $T_g$ of 250°–330° C. and containing repeating polymer units having at least 2 flexible linkages or 1 flexible linkage derived from the dianhydride, provided the amine groups of the diamine are in the meta position relative to each other.

2. A composition for the application of planar polyimide coatings having good solvent resistance to a substrate comprising a solution in aprotic-solvent of an aromatic dianhydride which dianhydride has been at least 20% esterified with a volatile alcohol and a substantially equimolar amount of a mixture of aromatic amines, comprising 90-99 mole % diamine and 10-1 mole % salt of tri- or tetra-amine and volatile organic acid, the diahydride and diamine containing a total of at least 2 flexible linkages, or both the dianhydride and diamine containing at least 1 flexible linkage or the dianhydride containing at least 1 flexible linkage provided the amine group of the diamine are in the meta position relative to each other.

3. The composition of claim 2 in which the aromatic dianhydride is 2,2-bis(3,4-benzenecarboxylic acid anhydride)perfluoropropane.

4. The composition of claim 3 in which the aromatic diamine is oxydianiline.

5. The composition of claim 3 in which the aromatic diamine is m-phenylene diamine.

6. The composition of claim 2 in which the volatile alcohol is ethanol.

7. The composition of claim 2 which contains the salt of 3,3',4,4'-tetraminobiphenyl and glacial acetic acid.

8. The composition of claim 2 which contains the salt of 3,3',4,4'-tetraminobiphenyl ether and glacial acetic acid.

* * * * *